United States Patent
Schaper

(10) Patent No.: US 11,415,112 B2
(45) Date of Patent: Aug. 16, 2022

(54) METHOD FOR OPERATING A WIND TURBINE

(71) Applicant: Wobben Properties GmbH, Aurich (DE)

(72) Inventor: Ulf Schaper, Staffhorst (DE)

(73) Assignee: Wobben Properties GmbH, Aurich (DE)

( * ) Notice: Subject to any disclaimer, the term of this patent is extended or adjusted under 35 U.S.C. 154(b) by 117 days.

(21) Appl. No.: 16/766,535

(22) PCT Filed: Nov. 27, 2018

(86) PCT No.: PCT/EP2018/082643
§ 371 (c)(1),
(2) Date: May 22, 2020

(87) PCT Pub. No.: WO2019/110364
PCT Pub. Date: Jun. 13, 2019

(65) Prior Publication Data
US 2021/0372375 A1  Dec. 2, 2021

(30) Foreign Application Priority Data
Dec. 7, 2017 (DE) ..................... 10 2017 129 112.1

(51) Int. Cl.
*F03D 80/40* (2016.01)
*F03D 7/04* (2006.01)

(52) U.S. Cl.
CPC ............... *F03D 80/40* (2016.05); *F03D 7/04* (2013.01); *F05B 2260/845* (2013.01);
(Continued)

(58) Field of Classification Search
None
See application file for complete search history.

(56) References Cited

U.S. PATENT DOCUMENTS

| 5,398,547 | A | * | 3/1995 | Gerardi | ................. | B64D 15/20 244/134 F |
| 7,086,834 | B2 | | 8/2006 | LeMieux | | |

(Continued)

FOREIGN PATENT DOCUMENTS

| DE | 102005016524 A1 | 12/2005 |
| DE | 102016124554 A1 | 6/2018 |

(Continued)

*Primary Examiner* — Igor Kershteyn
*Assistant Examiner* — Jason Fountain
(74) *Attorney, Agent, or Firm* — Seed Intellectual Property Law Group LLP

(57) ABSTRACT

There is provided a method of operating a wind turbine which has at least two rotor blades. A first ice detection method is performed by a first ice accretion detection unit. A first warning signal is output if an ice accretion which exceeds a first threshold value is detected at one of the rotor blades by the first ice detection method. A second ice detection method is performed by a second ice accretion detection unit. A second warning signal is output if an ice accretion which exceeds a second threshold value is detected at one of the rotor blades by the second ice detection method. An enable signal is output if a freedom from ice is detected at the at least two rotor blades by the second ice detection method. Intervention in the operation of the wind turbine is effected by a control unit if the first or second warning signal has been detected. Intervention in the operation of the wind turbine is deactivated by the control unit if the control unit receives an enable signal and has previously received the second warning signal.

10 Claims, 2 Drawing Sheets

(52) U.S. Cl.
CPC ... *F05B 2270/303* (2013.01); *F05B 2270/325* (2013.01); *F05B 2270/334* (2013.01)

(56) References Cited

U.S. PATENT DOCUMENTS

| | | | |
|---|---|---|---|
| 7,857,586 B2 | 12/2010 | Wobben | |
| 8,039,980 B2* | 10/2011 | Mizoue | F03D 7/042 |
| | | | 290/44 |
| 8,736,092 B2* | 5/2014 | Ormel | H02P 9/04 |
| | | | 290/44 |
| 9,759,193 B2* | 9/2017 | Jepsen | F03D 7/026 |
| 9,909,568 B2* | 3/2018 | Moser | B64D 15/20 |
| 2011/0042950 A1* | 2/2011 | Mizoue | F03D 7/042 |
| | | | 290/44 |
| 2011/0074154 A1* | 3/2011 | Ormel | H02P 9/04 |
| | | | 290/44 |
| 2011/0089692 A1 | 4/2011 | Girardin | |
| 2014/0091572 A1* | 4/2014 | Jepsen | F03D 7/0264 |
| | | | 290/44 |
| 2015/0035548 A1* | 2/2015 | Moser | F03D 80/40 |
| | | | 324/658 |
| 2019/0368472 A1 | 12/2019 | Müller | |

FOREIGN PATENT DOCUMENTS

| | | |
|---|---|---|
| EP | 2828164 B1 | 9/2015 |
| EP | 2828161 B1 | 6/2019 |
| WO | 2004104412 A1 | 12/2004 |

\* cited by examiner

METHOD FOR OPERATING A WIND TURBINE

BACKGROUND

Technical Field

The present invention concerns a method of operating a wind turbine and a corresponding wind turbine.

Description of the Related Art

Below certain temperatures it can happen that icing occurs on the rotor blades of a wind turbine. Such icing or ice accretion is unwanted because that can result in people and buildings in the surroundings of the wind turbine being endangered. In addition icing or ice accretion on the rotor blades of the wind turbine leads to a modified aerodynamic behavior so that the wind turbine can no longer be operated in the optimum fashion.

WO 2004/104412 A1 describes a method of operating a wind turbine, wherein the temperature in the surroundings of the wind turbine is detected. Operating parameters of the wind turbine are also detected. The outside temperature is checked in the event of a deviation in the detected operating parameters from stored operating parameters. If the outside temperature is below a limit value, operation of the wind turbine can be influenced. If the temperature in the region of the wind turbine is above the limit value, the stored parameter values can be adapted to the detected parameter values.

Known methods of ice accretion detection on rotor blades of a wind turbine are however inaccurate so that premature shutdown of the wind turbine can occur although the rotor blades of the wind turbine are not coated with ice.

On the German patent application from which priority is claimed the German Patent and Trade Mark Office searched the following documents: DE 10 2005 016 524 A1, DE 10 2016 124 554 A1, US 2011/0 089 692 A1, EP 2 828 161 B1 and WO 2004/104412 A1.

BRIEF SUMMARY

Provided is a method of operating a wind turbine which may overcome the above-described disadvantages. Provided is a method of operating a wind turbine which permits effective operation of the wind turbine and effective activation of a rotor blade heating means. Provided are techniques to ensure reliable restarting of the wind turbine when freedom from ice has been detected.

Two different ice detection methods for detecting ice on the rotor blades of the wind turbine are used in parallel. The two ice detection methods can respectively output separate warning signals, by way of which the wind turbine can be stopped in the event of critical icing. When that has occurred the wind turbine can be optionally deiced (if there is a rotor blade heating means) and re-started.

If the second ice detection method is suitable for establishing freedom from ice on the rotor blades then automatic restarting of the wind turbine can be triggered on the basis thereof. That can be necessary in particular with wind turbines which cannot be thawed by a rotor blade heating means. Automatic restarting of the wind turbine by the second ice detection method can also be triggered if the first ice detection method has initially detected or not detected the preceding icing. Restarting however is only possible if the second ice detection method has also previously detected icing. At the same time in the event of failure of the second ice detection method operational safety which is provided by the first ice detection method is not restricted. Accordingly ice detection is made possible, which permits stopping and restarting of the wind turbine without endangering the operational safety of the wind turbine.

There is provided a method of operating a wind turbine having at least two rotor blades. An outside temperature in the surroundings of the wind turbine is detected. Operating parameters of the wind turbine are detected and the detected operating parameters are compared to stored operating parameter values. A first warning signal or stop signal is output if the detected operating parameters differ from the stored operating parameters and the detected outside temperature falls below a first icing threshold. At least one ice thickness, ice mass and/or surface temperature at least one location on a surface of the rotor blade is detected and the detected ice thickness, ice mass and/or surface temperature is compared to a second icing threshold value. A second warning signal is output if the measured ice thickness or ice mass is above the second icing threshold value. Intervention into operation of the wind turbine and/or activation of a rotor blade heating means is effected if the first or second warning signal has been detected. Deactivation of the rotor blade heating means or deactivation of the intervention in the operation of the wind turbine is effected if the at least one detected ice thickness or ice mass is below the second icing threshold value or the surface temperature is above the second icing threshold value and the second warning signal has been previously registered.

Optionally the rotor blade heating means can be activated if the output power falls below a limit value (at a corresponding wind speed). Furthermore the wind turbine can be stopped if the power (at a corresponding wind speed) falls below a second limit value. Optionally the rotor blade heating means can be activated if the ice thickness or ice mass or surface temperature exceed or fall below limit values or established combinations of those criteria are involved.

According to an aspect of the invention deactivation of the rotor blade heating means can be effected in time-displaced relationship after the last occurrence of one of the activation conditions (first or second heating signal).

Also provided is a wind turbine having at least two rotor blades. The wind turbine has a first ice accretion detection unit adapted to compare operating parameters of the wind turbine with stored operating parameters and to output a first warning signal if the detected operating parameters deviate from the stored operating parameters and an outside temperature in the region of the wind turbine falls below a first icing threshold value and a second ice accretion detection unit having a plurality of sensors at the rotor blades, wherein surface temperatures and/or ice masses and/or ice thicknesses at the surface of the rotor blade are respectively detected by the sensors. The second ice accretion detection unit has a base station adapted to compare the detected ice masses or ice thicknesses or surface temperatures to a second icing threshold value and to output a second warning signal if the measured ice masses or ice thicknesses or surface temperatures are respectively above or below a second icing threshold value.

In addition there is provided a control unit adapted in dependence on the first and/or second warning signal to intervene in operation of the wind turbine and/or to activate a rotor blade heating means, wherein the control unit is adapted to deactivate the rotor blade heating means or deactivate intervention in operation of the wind turbine if the ice masses or ice thicknesses or surface temperatures measured by the sensors are respectively below or above the second icing threshold value and the control unit has previously received a second warning signal from the second ice accretion detection unit.

Techniques concern the notion of implementing ice accretion detection redundantly based on two separate ice detection methods. For that purpose according to a first ice detection method an outside temperature in the region of the wind turbine and operating parameters of the wind turbine are detected. The detected operating parameters are compared to stored operating parameters. If the detected operating parameters differ by a predetermined amount from the stored operating parameters and the detected outside temperature in the region of the wind turbine is below a first icing threshold value then a first warning signal can be output. That first warning signal indicates ice accretion at the rotor blades. Independently thereof in accordance with a second ice detection method a surface temperature of the rotor blade, an ice thickness and/or an ice mass is detected at at least one location on the rotor blade. The detected surface temperature, the detected ice thickness and/or the detected ice mass is compared to a second icing threshold value. If the detected temperature is below or the detected ice thickness and/or the detected ice mass is above the second icing threshold value then a second warning signal is output, which can point to icing of the rotor blade. If the first and/or the second warning signal has been detected then intervention in operation of the wind turbine is effected and/or the rotor blade heating means is activated. Intervention in operation of the wind turbine can for example represent a reduction in the speed of rotation of the wind turbine. Deactivation of the intervention in operation of the wind turbine is effected if the measured surface temperature is above the second icing threshold value and the second warning signal has been previously recorded.

According to an aspect of the invention upon stopping of the installation the first ice detection method can no longer operate. That results in the 'redundancy problem', more specifically the wind turbine cannot unconditionally listen to a restart command by the second ice accretion detection method as the first ice accretion detection method, by virtue of stoppage of the installation, could not contradict that information, that is to say in the event of unconditional restarting there would no longer be redundant ice detection.

Deactivation of the rotor blade heating means or restarting of the wind turbine can thus occur in dependence on the detected surface temperature and/or ice mass and/or ice thickness, only if the detected surface temperature and/or ice mass and/or ice thickness has previously respectively exceeded or fallen below the second icing threshold value. In that way it is possible to ensure that the first monitoring effect based on an icing characteristic cannot be cancelled by monitoring of the surface temperature and/or ice mass and/or ice thickness. This therefore provides a redundant method of detecting ice accretion on the rotor blades of the wind turbine. No redundancy problems occur in regard to control of the rotor blade heating means in normal operation so that the two ice detection methods can simply operate in parallel. The rotor blade heating means is activated if at least one of the systems requires that. The redundancy problem however occurs upon stoppage of the wind turbine as the characteristic-curve method (first ice accretion detection) then fails and can no longer detect icing. In that situation upon a malfunction the second ice accretion detection could trigger restarting without the first system being able to prevent that.

According to an aspect of the present invention there is provided a first detection unit which monitors the operating parameters of the wind turbine and the outside temperature of the wind turbine and can output a first warning signal. A second detection unit detects the surface temperature of the rotor blades and compares that to the second icing threshold value. The second detection unit can output with the first warning signal a plurality of parameters of the wind turbine and the outside temperature of the wind turbine and can output a first warning signal. A second detection unit detects the surface temperature of the rotor blades and compares that to the second icing threshold value. The second detection unit can output with the first warning signal a plurality of icing levels like for example no icing, minimum icing, moderate icing or severe icing.

Redundant ice accretion detection can be provided with the method. According to an aspect of the present invention the second detection unit could output for example four icing levels or stages.

The sensors for detecting the surface temperature of the at least one rotor blade can represent sensors which have been described in EP 2 828 164 B1. The sensors thus have a temperature detection unit, a wireless communication unit, at least one solar cell and an energy storage means. The measured temperatures are then wirelessly transmitted. The photovoltaic cell ensures the power supply for the sensor and the energy storage means ensures that the sensor can be operated even without light. The sensor can output the surface state of the rotor blade for example by four surface states, namely free surface (no icing), a very thin layer of ice or moisture on the rotor blade, a layer of ice of between 1 and 2 mm and a layer of ice of greater than 10 mm.

Techniques further concerns the notion of permitting effective ice accretion detection and effective restarting or resumption of operation of the wind turbine if freedom from ice has been detected. In addition rotor blade deicing can be started for example by means of a heating unit. If there is too much ice on the rotor blades the wind turbine can then be stopped. In addition the wind turbine can optionally be shut down if the ice accretion detection units have failed and for example the temperature is negative or in the range in which ice accretion can occur.

The method of operating a wind turbine ensures that, if two different ice accretion detection methods are used, a situation does not occur in which an ice accretion detection method detects ice but the other does not, and the result of that is that the wind turbine is not shut down or the rotor blade heating means is not activated. That applies in particular if one of the ice accretion detection methods can determine freedom from ice.

If freedom from ice can be detected then that can be used to provide that the wind turbine automatically starts up again as soon as the freedom from ice has been signaled.

According to a further aspect of the present invention an ice detection method can be implemented internally in the wind turbine while a further one can be implemented externally. This then takes account of what happens if the external ice detection method is defective or defectively signals freedom from ice.

According to an aspect of the present invention the first ice accretion detection method is based on a characteristic-curve method, that is to say a deviation from the normal power curve of the wind turbine is detected and at a corresponding outside temperature ice accretion is assumed to apply. If for example the second ice accretion detection method is defective and signals freedom from ice while according to the first ice accretion detection method it was detected that there is ice accretion, then the first ice accretion detection method can have priority, that is to say signaling of the freedom from ice by the second ice accretion detection method can be ignored. In particular that is achieved by a signal indicating freedom from ice by the second ice accretion detection method being deemed to be permissible only if the second ice accretion detection method has previously detected an ice accretion. If that is not the case it is then to be assumed that the second ice accretion detection method is defective and thus restarting is to be avoided as ice accretion is probably still present on the rotor blades.

According to an aspect of the present invention the second ice accretion detection unit which has a plurality of sensors on a surface of the rotor blades can determine not only the surface temperature but also an ice thickness. That can be effected in particular by capacitive measurement or a change in the frequency of oscillation of the rotor blade. In other words the ice thickness is determined by a change in capacitance.

According to an alternative aspect of the present invention the second ice accretion detection unit can have a plurality of oscillation sensors detecting the oscillations of the rotor blade. Based on those detected oscillations it is possible for example by a comparison with a threshold value to detect a differing oscillation which in turn can indicate an ice accretion.

According to an aspect of the present invention for controlling the blade heating means it is possible to have recourse to the information from the sensors of the second ice accretion detection unit, more specifically the surface temperature and the ice thickness.

The rotor blade heating can be effected on the basis of the detected surface temperature and/or based on the detected ice thickness.

According to a further aspect of the present invention the detected surface temperatures and/or the detected ice thicknesses can be stored in order possibly to evaluate them later.

Further configurations of the invention are subject-matter of the appendant claims.

BRIEF DESCRIPTION OF THE SEVERAL VIEWS OF THE DRAWINGS

Advantages and embodiments by way of example of the invention are described in greater detail hereinafter with reference to the drawing.

DETAILED DESCRIPTION

Figure 1:
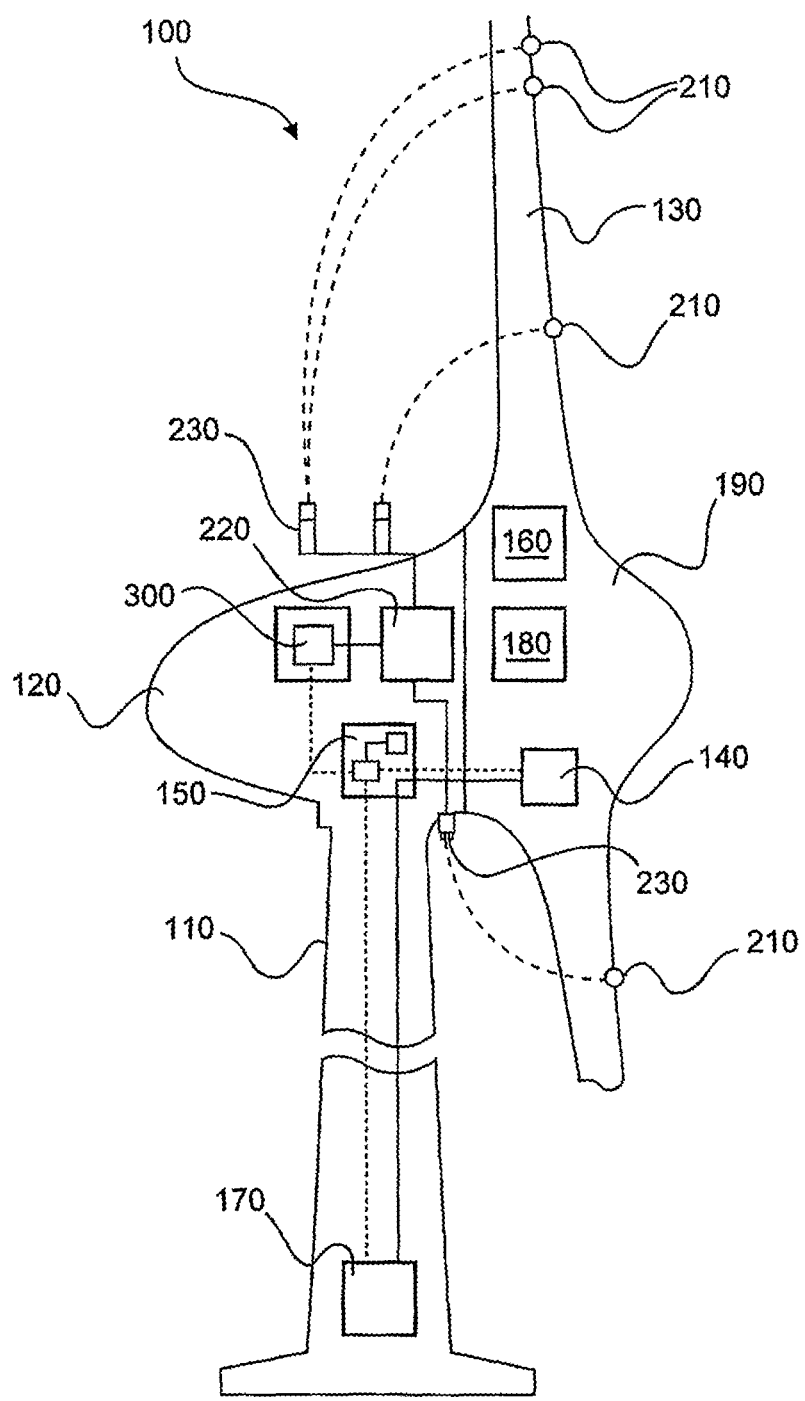
FIG. 1 shows a diagrammatic view of a wind turbine according to an embodiment of the invention.

FIG. 1 shows a diagrammatic view of a wind turbine according to an embodiment of the invention. The wind turbine 100 has a tower 110, a pod 120 and a plurality of rotor blades 130. The rotor blades 130 are connected to the rotor 190 and drive the aerodynamic rotor 190 in rotation if there is sufficient wind. The rotor 190 is coupled to an electric generator, the rotor of which is driven in rotation by rotation of the aerodynamic rotor so that electric power is generated. The wind turbine has a blade adjustment unit 140, by means of which the blade angles or pitch angles of the rotor blades 130 can be adjusted. In addition there can optionally be a pod control cabinet 150 in the pod 120, by means of which the components of the wind turbine in the region of the pod can be controlled. A control cabinet 170 can be provided in the region of the base of the tower 110, the cabinet 170 having electronic power components in order to deliver the electric power generated by the generator 180 to an external power supply network.

Two different ice detection methods for detection of ice on the rotor blades 130 of the wind turbine 100 are used in parallel. The two ice detection methods can respectively output separate warning or stop signals, by way of which the wind power can be stopped in the case of critical icing. When that has occurred the wind turbine can be optionally de-iced (if there is a rotor blade heating means) and re-started.

If the second ice detection method is suitable for establishing freedom from ice on the rotor blades automatic re-starting of the wind turbine can be triggered based on an 'ice-free signal'. That may be necessary in particular in the case of wind turbines which cannot be thawed out by a rotor blade heating means. Automatic re-starting of the wind turbine by the second ice detection method can also be triggered if the first ice detection method has first detected the preceding icing. At the same time in the event of failure of the second ice detection method the safety factor afforded by the first ice detection method is not nullified. This therefore permits ice detection which enables stoppage and re-starting of the wind turbine without endangering operational safety of the wind turbine.

The wind turbine has a first ice accretion detection unit 300 which detects the outside temperature in the region of the wind turbine and operating parameters of the wind turbine and compares the detected operating parameters to stored operating parameters. If the detected operating parameters differ from the stored operating parameters by a predetermined amount and the outside temperature falls below an icing threshold value then a first warning signal can be output. That first ice accretion detection method can only be used when the rotor is rotating. When the wind turbine is stationary the first ice detection method does not give any results. The function of the first ice detection unit 300 is described in greater detail in WO 2004/104412 A1.

The content of WO 2004/104412 A1 is hereby incorporated into this application in regard to the functioning of ice accretion detection.

The wind turbine has a second ice accretion detection unit 200 having a plurality of sensors 210 on the rotor blades 130. Those sensors detect a surface temperature of the rotor blade and/or the ice mass and/or the ice thickness and transmit those values to a base station. The function of those sensors is described in detail in EP 2 828 164 B1.

The ice detection accretion unit 200 has a base station 220 and a plurality of antennas or transmission units 230 for detection of the signals transmitted by the sensors 210. In the base station 220 the detected temperature signals are compared to an icing threshold value and a second warning signal can be output if the detected temperature is below the icing threshold value and/or an ice mass and/or ice thickness is above the icing threshold value.

Optionally the sensors 210 can output four different stages or levels indicating differing ice accretion. Those stages or levels can represent no ice accretion, slight ice accretion, moderate ice accretion or severe ice accretion or icing.

The first and second warning signals or the stop signal can be output to the pod control cabinet 150. As soon as the pod control cabinet receives the first or second warning signal it can limit operation of the wind turbine, for example by the rotary speed being reduced or by a rotor blade heater 160 being activated to heat and thus de-ice the rotor blades.

A redundant ice accretion detection effect can thus be provided with the system. Re-starting of the wind turbine or de-activation of the rotor blade heater can be effected based on the measurement values of the ice accretion detection unit 200 only if that has previously established ice accretion.

Rotor blade heating can also be preventatively actuated to avoid an ice build-up. Such a blade heating effect is also triggered by the ice detection method, in which case lower threshold values and/or other decision algorithms are used. The signals of the two ice detection methods for activation of the rotor blade heater during operation of the turbine can represent a first heating signal and a second heating signal.

The second ice detection method can be based on spotwise ice thickness measurements at one or more locations on the rotor blade. In that case the measurements can be based on measurement of a capacitance or a capacitance change. Furthermore measurements can optionally be effected in respect of the blade surface temperature. Icing can be established if a high ice thickness threshold value is exceeded at a few locations on the rotor blade or an average ice thickness threshold value is exceeded at many locations on the rotor blade. Freedom from ice can optionally be established if there are a sufficient number of measurement points and the average ice thickness threshold value is nowhere exceeded on the rotor blade.

The rotor blade heater can be activated if the lowest measured blade surface temperature falls below a threshold value and at the same time a certain proportion of the rotor blade surface exceeds a given ice thickness.

As an alternative thereto ice thickness can also be ascertained based on the change in the rotor blade oscillation characteristic. Acceleration sensors in the rotor blades can measure the rotor blade vibration frequencies. It is possible to conclude that there is an increase in mass (and thus icing) by a comparison of the measured frequencies with stored vibration frequencies in the ice-free state and suitable corrections. An increase in mass ascertained in that way (=ice mass) is compared to different limit values, from which icing signals (warning signals), ice-freedom signals (re-starting signals) and rotor blade heating signals can be produced.

Figure 2:
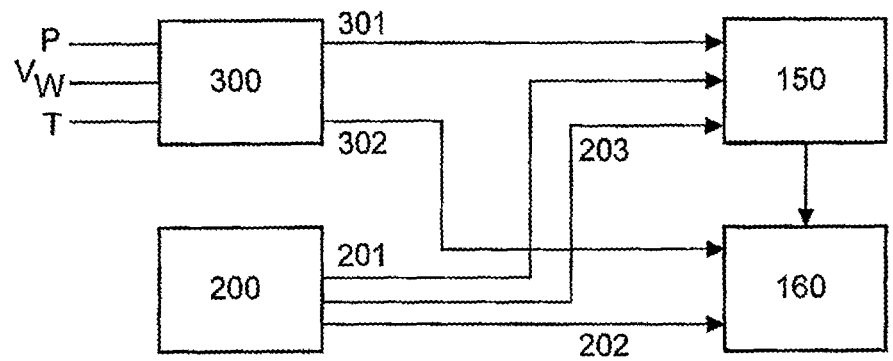
FIG. 2 shows a block circuit diagram of the ice accretion detection units and the control unit of the wind turbine.

FIG. 2 shows a block circuit diagram of the ice accretion detection units and the control unit of the wind turbine. In particular the first and second ice detection accretion units 300, 200, the control unit 150 of the wind turbine and the rotor blade heater 160 are shown. The first ice accretion detection unit 300 receives for example the currently prevailing power of the wind turbine, the wind speed and for example a temperature in the region of the wind turbine. The first ice accretion detection unit 300 can output either critical icing 301 or a beginning of icing 302. The signal of critical icing 301 is output to the control unit 150 and the signal of a beginning of icing 302 is output to the rotor blade heater 160.

Figure 3:
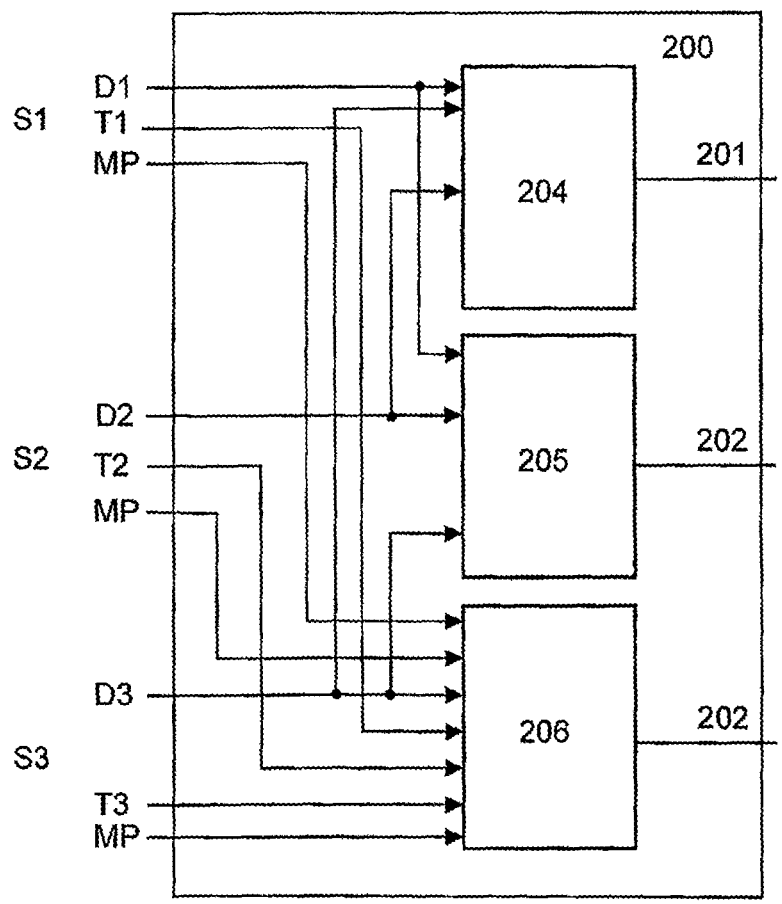
FIG. 3 shows a block circuit diagram of the second ice accretion detection unit.

FIG. 3 shows a block circuit diagram of the second ice accretion detection unit. The second ice accretion detection unit 200 optionally delivers three different output signals, namely critical icing 201, freedom from ice 203 and the beginning of icing 202. The critical icing 201 and the freedom from ice 203 are output to the control unit 150 and the signal in respect of the beginning of icing 202 is output to the rotor blade heater 160. The control unit 150 serves to control the wind turbine and in particular can start or stop the wind turbine. It further serves to control the rotor blade heater. Starting of the wind turbine is enabled by the control unit 150 if a signal 203 in respect of freedom from ice is received.

The second ice accretion detection unit 200 has a first detection unit for detecting critical icing 204, a second detection unit for detecting freedom from ice 205 and a third detection unit 206 for determining a beginning of icing. The first detection unit 204 receives the ice thickness signals D1-D3 from the sensors S1-S3 and on the basis of those data ascertains whether there is or is not critical icing. If thick layers have been detected on the sensors that can only represent a thick layer of ice so that the signal 201 is output.

The second detection unit 205 also acquires the ice thickness signals of the sensors. When there are no layers or if the ice thickness is slight or is below a threshold value then it can be assumed that there is freedom from ice and an ice freedom signal 203 is output.

The third detection unit 206 serves for control of the rotor blade heater. In that respect in particular the ice thickness measurement and temperature measurement are taken into consideration. Furthermore the position of the sensors can optionally also be taken into account.

In particular only those sensors which are at a mounting position which can be influenced by the rotor blade heater can be evaluated.

The second ice accretion detection unit 200 can be activated if the mode of operation of the first ice accretion detection unit 300 is restricted by virtue of meteorological conditions, for example on the basis of excessively low or excessively high wind speed, in particular situations like great wind shear or slope flow.

The invention claimed is:

1. A method of operating a wind turbine having at least two rotor blades, the method comprising:
   carrying out a first ice detection method by a first ice accretion detection unit;
   outputting a first warning signal if an ice accretion is detected at one of the at least two rotor blades that exceeds a first threshold value, by the first ice detection method;
   carrying out a second ice detection method by a second ice accretion detection unit, wherein the second ice detection method is different from the first ice detection method;
   outputting a second warning signal if an ice accretion is detected at one of the at least two rotor blades that exceeds a second threshold value, by the second ice detection method;
   outputting an enable signal if freedom from ice is detected at the at least two rotor blades by the second ice detection method;
   intervening in operating of the wind turbine by a control unit if the first warning signal or the second warning signal has been detected, wherein the intervening comprises changing an operation of the wind turbine; and
   deactivating the intervening in the operation of the wind turbine by the control unit if the control unit receives the enable signal and has previously received the second warning signal.

2. The method of operating a wind turbine according to claim 1 wherein carrying out the first ice detection method comprises:
   detecting an outside temperature in surroundings of the wind turbine by the first ice accretion detection unit;
   detecting operating parameters of the wind turbine by the first ice accretion detection unit;

comparing the detected operating parameters with stored values of the operating parameters by the first ice accretion detection unit; and outputting a first warning signal if the detected operating parameters differ from the stored operating parameters and the detected outside temperature falls below a first icing threshold value.

3. The method of operating a wind turbine according to claim 1 wherein carrying out the second ice detection method comprises:

detecting an ice thickness or ice mass of an ice accretion on the at least two rotor blades at at least one location on a surface of the rotor blade by the second ice accretion detection unit;

comparing the detected ice thickness or ice mass with a second icing threshold value by the second ice accretion detection unit;

outputting the second warning signal if the detected ice thickness or ice mass is above the second icing threshold value; and outputting the enable signal if no ice thickness was detected or if the detected ice thickness or ice mass is below the second icing threshold value.

4. The method of operating a wind turbine according to claim 3 wherein:

the first warning signal of the first ice accretion detection unit indicates critical icing of the rotor blade or a beginning of icing of the rotor blade, the second warning signal of the second ice accretion detection unit indicates critical icing, and the enable signal indicates freedom from ice on the at least two rotor blades.

5. The method of operating a wind turbine according to claim 1 comprising:

detecting at least one surface temperature by the second ice accretion detection unit at those locations on a surface of the rotor blade, at which rotor blade heating can lead to an increase in temperature of the surface at those locations.

6. The method of operating a wind turbine according to claim 1 wherein a rotor blade heating is activated if the first warning signal or the second warning signal, or both warning signals indicates a beginning of icing.

7. The method of operating a wind turbine according to claim 1 comprising:

activating the second ice accretion detection unit if the functioning of the first ice accretion detection unit is limited due to meteorological conditions.

8. A wind turbine, comprising:

at least two rotor blades;

a first ice accretion detection unit adapted to perform a first ice detection method and to output a first warning signal if an ice accretion exceeding a first threshold value is detected at one of the rotor blades;

a second ice accretion detection unit adapted to perform a second ice detection method, wherein the second ice detection method is different from the first ice detection method, wherein the second ice accretion detection unit is adapted to output a second warning signal if ice accretion exceeding a second threshold value is detected at one of the rotor blades by the second ice detection method and output an enable signal if a freedom from ice is detected at the at least two rotor blades; and a control unit adapted in dependence on the first warning signal or the second warning signal, or both the first and second warning signals to intervene in operation of the wind turbine and to deactivate the intervention in operation of the wind turbine by the control unit if the control unit receives the enable signal and has previously received the second warning signal.

9. The wind turbine according to claim 8 wherein the second ice accretion detection unit has a plurality of sensors on surfaces of the rotor blades, wherein the plurality of sensors are configured to measure capacitance indicative of an ice thickness on the rotor blades.

10. The wind turbine according to claim 8 wherein, the second ice accretion detection unit has at least one oscillation sensor configured to detect an oscillation of a rotor blade, and wherein the second ice accretion detection unit is adapted to determine an ice thickness of the ice accretion or freedom from ice based on the detected oscillation of the rotor blade or a change in oscillation of the rotor blade.

* * * * *